(12) United States Patent
Mondello et al.

(10) Patent No.: US 10,824,709 B2
(45) Date of Patent: Nov. 3, 2020

(54) AUTOFILL FOR APPLICATION LOGIN CREDENTIALS

(71) Applicant: Apple Inc., Cupertino, CA (US)

(72) Inventors: Richard J. Mondello, Mountain View, CA (US); Morgan H. Winer, Sunnyvale, CA (US); Chelsea E. Pugh, San Francisco, CA (US); Shuchen Li, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 193 days.

(21) Appl. No.: 15/721,606

(22) Filed: Sep. 29, 2017

(65) Prior Publication Data

US 2018/0349593 A1 Dec. 6, 2018

Related U.S. Application Data

(60) Provisional application No. 62/514,934, filed on Jun. 4, 2017.

(51) Int. Cl.
*G06F 21/41* (2013.01)
*H04L 29/06* (2006.01)

(52) U.S. Cl.
CPC ............ *G06F 21/41* (2013.01); *H04L 63/083* (2013.01); *H04L 63/0815* (2013.01)

(58) Field of Classification Search
None
See application file for complete search history.

(56) References Cited

U.S. PATENT DOCUMENTS

| | | | | |
|---|---|---|---|---|
| 5,987,480 A | * | 11/1999 | Donohue | G06Q 30/02 |
| | | | | 715/207 |
| 6,859,878 B1 | * | 2/2005 | Kerr | G06F 21/41 |
| | | | | 380/241 |
| 9,819,673 B1 | * | 11/2017 | Johansson | H04L 63/0838 |
| 2002/0186249 A1 | * | 12/2002 | Lu | G06F 21/31 |
| | | | | 715/781 |
| 2010/0115279 A1 | * | 5/2010 | Frikart | G06F 19/3418 |
| | | | | 713/171 |
| 2012/0266217 A1 | * | 10/2012 | Kaal | H04L 63/0407 |
| | | | | 726/4 |
| 2014/0007205 A1 | * | 1/2014 | Oikonomou | G06F 21/35 |
| | | | | 726/6 |
| 2014/0007209 A1 | * | 1/2014 | Zucker | H04W 12/06 |
| | | | | 726/7 |

(Continued)

*Primary Examiner* — Benjamin E Lanier
(74) *Attorney, Agent, or Firm* — Kowert, Hood, Munyon, Rankin & Goetzel, P.C.

(57) ABSTRACT

Described is a system (and method) for automatically populating login credentials for an application such as a third-party application (or app) installed on a device. These applications are often associated with an entity that may operate or control a website, service, or another application. For example, browsers often store login credentials (e.g. username and password) of previously visited websites. Accordingly, the system may retrieve applicable login credentials for the application in response to verifying the application is authorized to be associated with the website associated with the retrieved password. Accordingly, the system may provide a convenient and safe mechanism to retrieve applicable login credentials even in instances where a developer of the application has not provided an explicit capability of such a feature.

30 Claims, 8 Drawing Sheets

(56) References Cited

U.S. PATENT DOCUMENTS

| | | | | |
|---|---|---|---|---|
| 2014/0101310 A1* | 4/2014 | Savage | ............... | H04L 43/00 |
| | | | | 709/224 |
| 2014/0157390 A1* | 6/2014 | Lurey | ............... | G06F 21/123 |
| | | | | 726/7 |
| 2014/0173708 A1* | 6/2014 | Garlick | ............... | H04L 63/08 |
| | | | | 726/7 |
| 2014/0208112 A1* | 7/2014 | McDonald | ............ | H04W 12/04 |
| | | | | 713/171 |
| 2014/0289824 A1* | 9/2014 | Chan | ............... | G06F 9/54 |
| | | | | 726/5 |
| 2014/0298432 A1* | 10/2014 | Brown | ............... | H04L 63/083 |
| | | | | 726/6 |
| 2015/0074615 A1* | 3/2015 | Han | ............... | G06K 9/00033 |
| | | | | 715/863 |
| 2015/0089579 A1* | 3/2015 | Manza | ............... | H04L 63/0838 |
| | | | | 726/1 |
| 2015/0286737 A1* | 10/2015 | Cattone | ............ | G06F 3/04842 |
| | | | | 715/234 |
| 2016/0034892 A1* | 2/2016 | Carpenter | ............ | G06Q 20/40 |
| | | | | 705/44 |
| 2016/0105420 A1* | 4/2016 | Engan | ............... | H04L 9/3228 |
| | | | | 455/411 |
| 2016/0350365 A1* | 12/2016 | Subramaniam | .... | G06Q 30/0277 |
| 2017/0011213 A1* | 1/2017 | Cavanagh | ............ | G06F 21/45 |
| 2017/0142191 A1* | 5/2017 | Caldwell | ............ | H04L 63/083 |
| 2017/0289161 A1* | 10/2017 | Yoskowitz | ............ | H04L 63/083 |
| 2018/0083959 A1* | 3/2018 | Barbosa | ............ | H04L 63/0853 |
| 2018/0287902 A1* | 10/2018 | Chitalia | ............ | H04L 43/045 |

\* cited by examiner

AUTOFILL FOR APPLICATION LOGIN CREDENTIALS

RELATED APPLICATIONS

This application claims the benefit of U.S. Provisional Patent Application No. 62/514,934, filed Jun. 4, 2017, the entirety of which is incorporated herein by reference.

BACKGROUND

Applications installed on devices often require a user to enter login and password information. Devices typically have many applications, and accordingly, remembering and entering login information becomes tedious to the user. Accordingly, applications, such as web browsers, often have capabilities to save login and password information. In order to secure such information, however, it is often only accessible to the web browser. Applications are often provided by entities controlling or operating related websites and other applications or services, and thus, may use the same login credentials. Accordingly, users often expect such information to be shared across applications. Developers, however, often do not explicitly provide such capabilities, and accordingly, there is a need to provide a safe mechanism to share credentials across services or applications.

SUMMARY

Described is a system (and method) for automatically populating login credentials for an application such as a third-party application (or app) installed on a device (e.g. from an app store). These applications often do not have a mechanism to retrieve previously entered login credentials (e.g. upon launching the application for the first time after installation). The applications, however, are often associated with an entity that may operate or control a related service such as a website, application, etc., which may be part of a platform. For example, a BBC News application would be an application authorized to be associated with the BBC News website. As described above, web browsers often store login credentials (e.g. username and password) of previously visited websites. Accordingly, the system may retrieve applicable login credentials for the application in response to verifying the application is authorized to be associated with the website associated with the retrieved credentials. The verification may include a process that prevents unauthorized (or malicious) access to such credentials. The system may perform a verification heuristically by determining a cross association between a particular application and a service (e.g. website). The cross association may be based on determining the application and service are authorized to cooperate in a particular manner such as sharing credentials, universal linking, continued activity, etc. as further described herein. Accordingly, the system may provide a mechanism to determine a retrieval of login credentials is safe even in instances where a developer of an application has not provided an explicit capability for such a feature.

BRIEF DESCRIPTION OF THE DRAWINGS

Embodiments of the disclosure are illustrated by way of example, and not by way of limitation, in the figures of the accompanying drawings in which like reference numerals refer to similar elements.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" or "some embodiments" means that a particular feature, structure, or characteristic described in conjunction with the embodiment can be included in at least one embodiment. The appearances of the phrase "embodiment" in various places in the specification do not necessarily all refer to the same embodiment.

As described above, the disclosure relates to a system (and method) for automatically populating login credentials for an application. Such a system may be provided within an operating environment.

Figure 1:
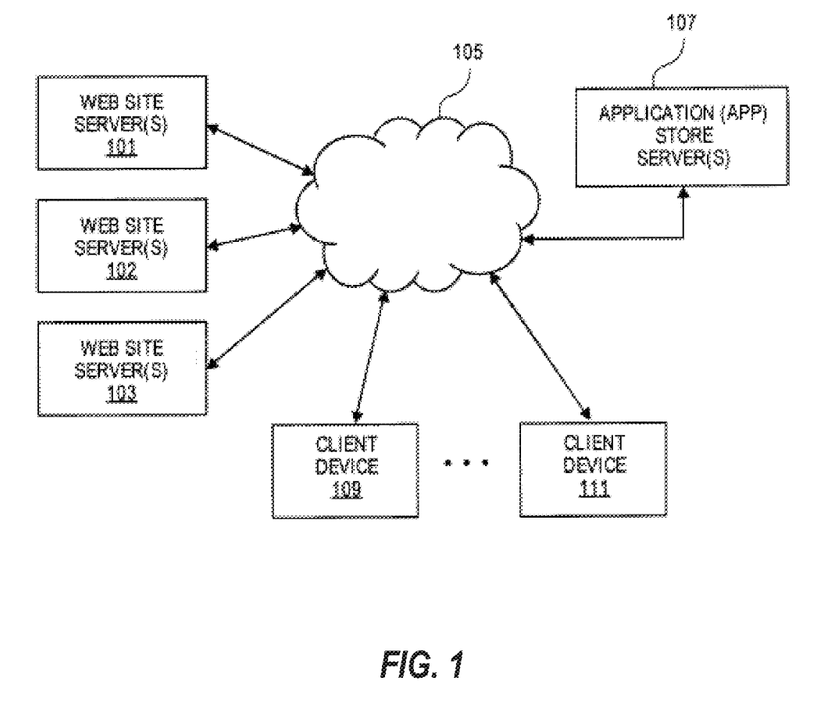
FIG. 1 is a block diagram illustrating an example operating environment according an embodiment of the disclosure.

FIG. 1 shows an example of such an operating environment according to an embodiment of the disclosure. A plurality of website servers or other web resources provided by servers are connected via network 15 to a plurality of client devices, such as client devices 109 and 111. The network 15 may be any wired or wireless network. Each website shown can be a distinct domain that is provided by a plurality of web servers, which may serve web content or other web resources from the domain. For example, the website servers 101 can be servers for the domain bbc.co.uk, and the website servers 102 can be the servers for the domain espn.com, and the website servers 103 can be the servers for the domain xyz.com. In addition, one or more application stores can be connect to the network 15 to provide apps for downloading and installing onto the one or more client devices, such as client devices 109 and 111. As is known in the art, each client device can purchase or otherwise obtain apps from one or more app stores, such as app store servers 107 and cause those apps to be downloaded onto a client device. For example, a user of client device 109 can download an app from the BBC or ESPN or XYZ to install these apps, which are often associated with the corresponding websites (such as the BBC or ESPN or XYZ websites). The client devices 109 and 111 can be any one of a variety of data processing systems, such as smartphones, tablet computers, laptop computers, desktop computers, etc. System 1200 as described below, shows an example of an architecture for a data processing system, which can be used to implement the client devices or the servers described above.

Figure 2:
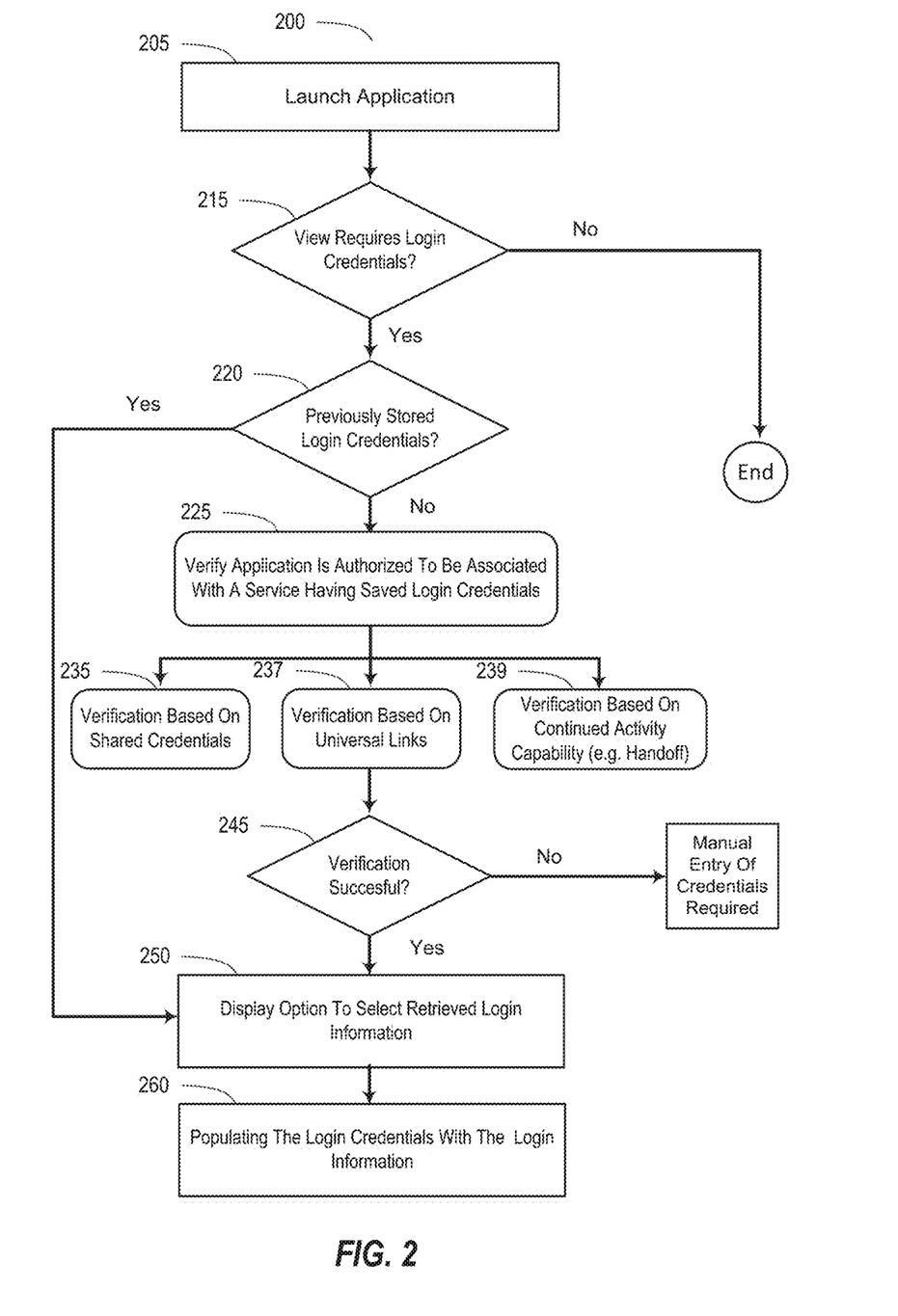
FIG. 2 is an example flow chart of a process for automatically populating login credentials for an application according to an embodiment of the disclosure.

FIG. 2 is an example flow diagram of a process for automatically populating login credentials for an application according to an embodiment of the disclosure. Process 200 may use processing logic, which may include software, hardware, or a combination thereof. For example, process 200 may be performed by a system (e.g. client device 109).

In 205, the system may launch (or open, or execute) an application such as third-party application. In one embodiment, a third-party application may refer to an application provided (e.g. via an application store) by an entity (e.g. manufacturer or company) other than the entity providing the operating system for the device, or the device itself. In some instances, an application may require login credentials (e.g. username and password) to access features of the application. In 215, the system may determine if a view (e.g. screen, page, etc.), of the application requires login credentials. As further described herein, the system may perform a determination, including a heuristic process, to determine the classification of one or more data entry fields within the view to determine whether the application requires login credentials. If the application does not require login credentials, the user may proceed to use the application and the auto-populate procedure is not required. If it is determined that the application does require login credentials, in 220, the system may determine if the application has previously stored login credentials. If so, in 250, the system may display an option to select the retrieved login information as further described herein. If it is determined that the application has not previously stored login credentials, in 225, the system may perform a verification process to determine if the application is authorized to be associated with the service that has saved login credentials that may be used for the application. In one embodiment, a service may include one or more components that are part of a platform (e.g. an application and/or related websites, APIs, etc.). For example, a service may include a website or related application that may be part of a platform (e.g. Facebook, Twitter, LinkedIn, etc.) that includes particular applications that may be installed on a device and are associated with corresponding websites. For instance, in one embodiment, a browser application may store saved login credentials for a particular website that is associated with the application. As another example, an application may attempt to retrieve login credential from a service such as a related application or other component that is associated with a particular application installed on a device. Accordingly, the application may attempt to retrieve and use such previously stored login credentials. However, in order to prevent unauthorized (or malicious) access to such login credentials, the system may validate an association between the application and the service.

The system may perform a verification process for an application using one or more methods, for example, verification methods 235, 237, and 239, as further discussed herein. In one embodiment, in 235, the system may perform a verification based on shared credentials. In one embodiment, an application may be verified based on a trust relationship. For example, the system may attempt to verify the trust relationship between an application and another application or service. For example, it may be possible for an application to declare an association in an unauthorized manner (e.g. inadvertently or maliciously), and thus, the system may guard against such a scenario by verifying the trust relationship is a two-way association (e.g. verify a cross-reference exists). In one embodiment, a two-way association may be verified based on confirming shared credentials. For example, the system may verify the ability for an application and a website to share web credentials.

Figure 3:
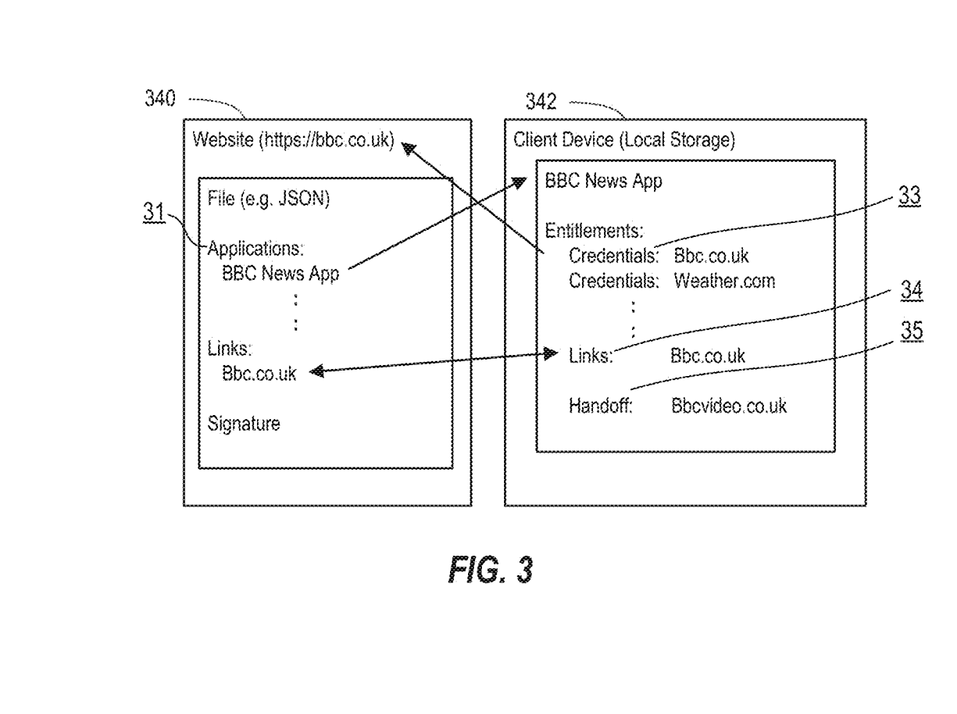
FIG. 3 is an example of lists used to determine associations between an application and service according to an embodiment of the disclosure.

In one embodiment, the system may access one or more files for each of the application and a website, and verify that each references the other. In one embodiment, associations for an application may be determined according to a set of predefined entitlements. For example, a particular application may be required to specify particular capabilities as part of a development framework (e.g. as a requirement for distribution via an application store). For example, a platform may implement an underlying security model to protect an application from authorized modification and distribution. Accordingly, the framework may require an application to specify capabilities, which may be signed and authenticated. In one embodiment, the capabilities may include entitlements as well as other properties that may be stored, for example, in an information property list file. In one embodiment, an entitlement may be a right granted to an application that provides information related to allowing the application to access certain resources (e.g. extend beyond sandboxed capabilities) or to perform certain operations. In one embodiment, the application may specify websites to which its credentials may be shared. Accordingly, in one embodiment, a list of entitlements for the application may include a list of domains for which the application's credentials may be shared. For example, as shown in FIG. 3, a list 342 stored on a client device (e.g. in local storage) includes a list of entitlements for the BBC News APP. As shown, the entitlements may include a list of domains 33, which in this example include bbc.co.uk and weather.com.

Correspondingly, in order to determine associations for the service (e.g. website), the system may access a file associated with the service. In one embodiment, the system (e.g. client device 109) may access a file that is associated with the service and stored remotely from the client device on which the list 342 of entitlements for the application is stored. For example, in one embodiment, a file (e.g. JSON, or JavaScript Object Notation) may be stored on a website (e.g. server). The file may include a list of applications (or application IDs) that are authorized to be associated with the website. For example, as shown in FIG. 3, a list 340 stored on a website includes a list of applications 31 including the BBC News App. In one embodiment, a framework that provides the ability to share credentials may require that the associations remain secure. For example, the framework may require obtaining a signing certificate (e.g. code signing certificate) for the file (e.g. credentials file). For example, the framework may require the certificate to be issued by a certificate authority (CA). Accordingly, the file (e.g. JSON file) may be authenticated as coming from a particular domain. In one embodiment, the file may also include a time-to-live parameter, which specifies how long the file is authorized to be valid. In addition, as shown, a signature, which may be added or appended to the file, may be used by a client device to validate the authenticity of the file or the contents of the file. Accordingly, a list of associations may be verified as being authentic and authorized by the domain from which it is accessed (or downloaded) using a certificate or signature as described above. Accordingly, the system may verify the application by cross-referencing lists 340 and 342 as further described herein.

Returning to FIG. 2, in one embodiment, the system may perform a verification based on universal links in 237. A universal link as referred to herein can provide a secure way for allowing a selection of a link in a first application to result in the display of the content from the link in a different, second application. In one embodiment, this may be referred to as a website to application (or app) association. For example, a user may search, using a browser application, for a restaurant in a Yelp webpage (on Yelp's website) and tap or click on a Yelp restaurant listing and instead of displaying the content of that restaurant listing in the browser, the content is displayed within the Yelp app that is also installed on the client device.

For example, further non-limiting features of providing universal links may be found in commonly assigned U.S. patent application Ser. No. 14/732,612, titled "Associating a URL or Link Between Two Applications," filed Jun. 5, 2015, the entirety of which is incorporated herein by reference.

In one embodiment, support for universal links may be identified through a list of entitlements as described above. For example, referring once again to FIG. 3, a list 342 stored on a client device (e.g. in local storage) includes a list of entitlements for the BBC News APP, which may include a list of links 34 that specify a URL. It should be noted that various entitlements shown in this example are included in a single file, but it is contemplated that multiple files may be used (e.g. for each type of verification process).

To determine universal link associations for the service (e.g. website), the system may access a file associated with the service. For example, as described above, in one embodiment, a file (e.g. JSON) may be stored on a website and may include a list of applications (or application IDs) that are authorized to be associated with the website. As described above in FIG. 3, the list of associated applications 31 includes the BBC News App. Accordingly, in one embodiment, a list of entitlements and a list of applications associated with a website may also be used to establish a two-way association within the context of universal links.

Returning once again to FIG. 2, in one embodiment, in 239, the system may perform a verification based on a continued activity capability (or handoff capability). As referred to herein, in one embodiment, the continued activity capability may include the ability to commence (or start) an activity on a first device, and continue that activity on a second device. For example, the continued activity may include writing an email on a first device (e.g. desktop computer), and then continuing to write the email on a second device (e.g. smartphone). As another example, the continued activity may include performing an activity within a browser or web-based interface on a first device, and then continuing that activity using an application (e.g. native application) on a second device. For example, the user may view a video from a website or web-based interface on a first device, and then continue watching the video in an application (e.g. native application media player) on a second device, or vice versa. As referred to herein, the native application may include an application that has been developed for use on a particular platform (or OS) or device.

In one embodiment, the system may infer an authorized association by determining a capability of an application-to-web-based interface handoff, or a web-based interface-to-application handoff. For example, for an application-to-web-based interface, the application may create a particular object (e.g. activity object) and set a particular URL property. Accordingly, in one embodiment, the system may infer information from the object (e.g. URL property) as to whether an association between a website and a particular application is present. In another embodiment, support of a continued activity capability may also be reflected in the list of entitlements described above. For example, for a web-based interface-to-application handoff, a particular application may be required to subscribe to such a feature. Accordingly, the application may include a domain from which the application may receive handoffs in an entitlements list. In a similar manner as described above, a website attempting to provide a handoff may also include a corresponding file (e.g. JSON) file as described above. For example, referring once again to FIG. 3, list 342 that includes a list of entitlements for the BBC News APP, may include a domain from which handoffs may be received, which in this case is bbcvideo.co.uk. Accordingly, based on associations related to a handoff feature, the system may determine authorized associations.

Based on various types of entitlements and associations described above, a two-way association between a service and an application may be verified.

Figure 4:
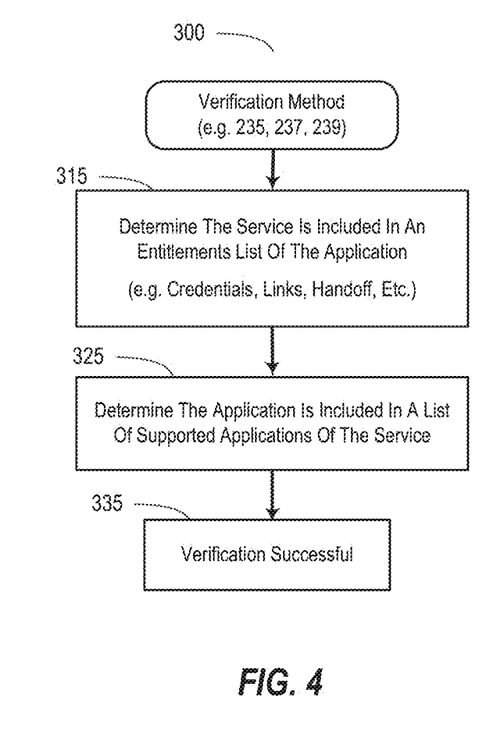
FIG. 4 is an example flow diagram of performing a verification of an application according to an embodiment of the disclosure.

FIG. 4 is an example flow diagram of performing a verification of an application according to an embodiment of the disclosure. Process 300 may be performed by a system (e.g. client device 109). In some embodiments, each of the two-way associations may be verified using process 300. For example, in 315, the system may determine whether a first service is included in an entitlements list of the application (e.g. list 342), and, in 325, the system may determine whether the application is included in a list of supported applications of the first service (e.g. list 340). If the system can verify the two-way association (as shown in FIG. 3), the system may deem the verification successful in 335.

It should be noted that the above verification processes, in some embodiments, may be performed prior to attempting to retrieve login credentials (e.g. prior to operation 205 or 215). For example, in one embodiment, the system may perform a validation process by a trusted system or service at installation time (or first runtime) of an application. Accordingly, in one embodiment, applications and websites can rely on the trusted system or service (which is distinct from the application) to perform secure validation. In one embodiment, after the one or more files have been validated, the contents of the file may be parsed to extract the associations. These associations may then be stored in a data structure, which may be accessed for the verification processes as described above. In one embodiment, the system may create a list of applications that support one or more of shared credentials, universal links, and continued activity. For example, the corresponding domains may be verified from retrieved files (e.g. JSON) and the information may be stored in such a list. Accordingly, the list may be a source of verified two-way associations, which may be parsed when required. In addition, applications (and domains) may be added to the list as necessary (e.g. upon installation of a new application) using the authentication methods described herein.

Returning to one again to FIG. 2, in 245, if the verification of an application was not successful, the system may proceed to require the user to manually enter credentials. If the verification was successful, and 250, the system may display an option to select the retrieved login information. In one embodiment, the retrieved login information may be retrieved from a keychain. For example, a user may have previously logged into a website using a browser by entering a user name and password, and saved those credentials to the keychain. In 260, the system may populate login credentials with the retrieved information in a secure manner as further discussed herein. Accordingly, upon completion of the verification process described above, the system may grant access to such login credentials.

Figure 5:
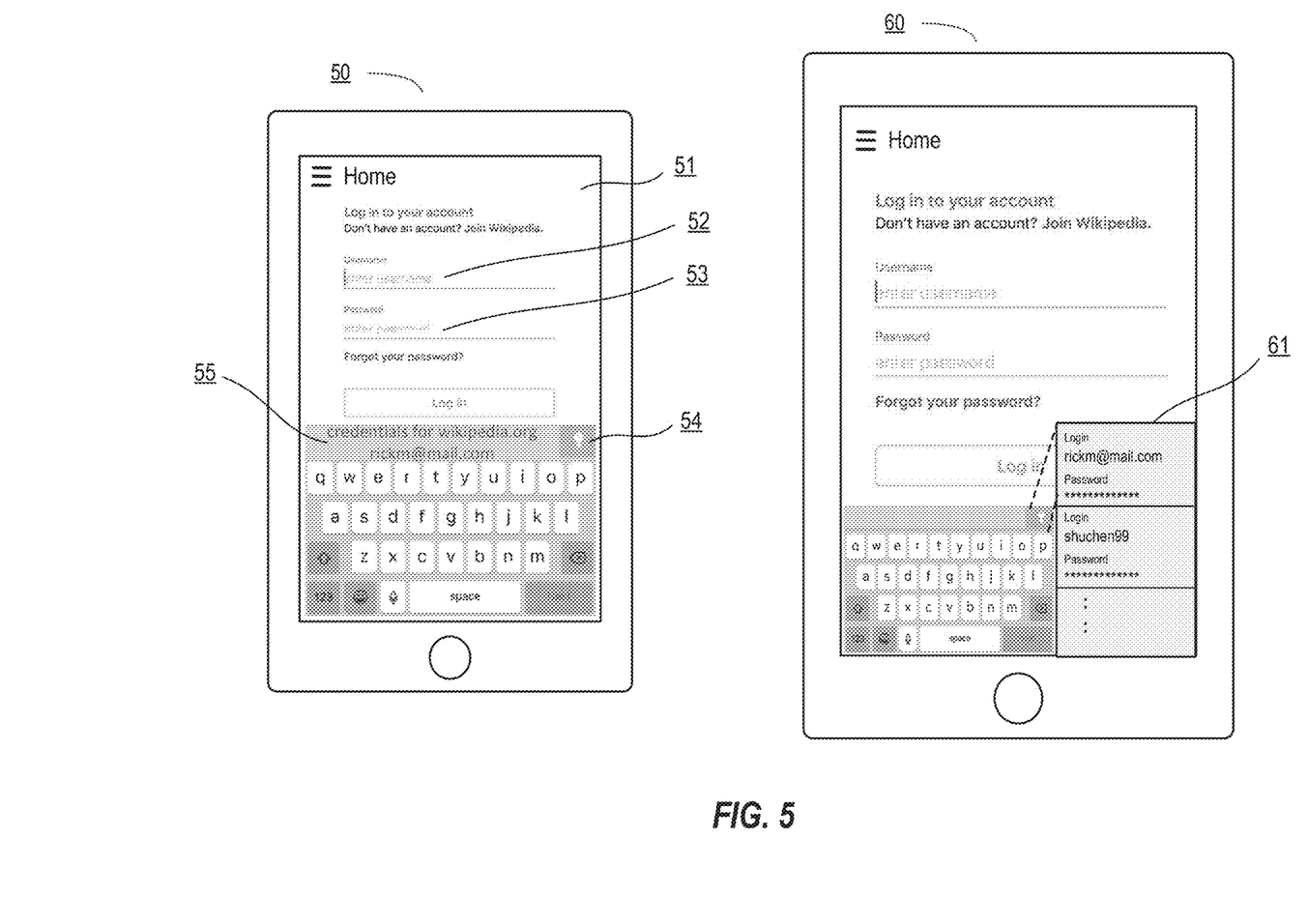
FIG. 5 is an example diagram of an interface that populates login credentials according to an embodiment of the disclosure.

FIG. 5 is an example diagram of interfaces that provides an option to select retrieved login credentials. As shown, in diagram 50, a view 51 may be displayed by an application (e.g. Wikipedia application as shown). The view may include one or more data entry fields. For example, the view may include a data entry field corresponding to a username 52 and/or data entry field corresponding to a password 53. In one embodiment, as shown, the interface may provide a candidate login credential 55. In one embodiment, the candidate credential may include a reference to the associated website (e.g. wikipedia.com). In addition, the candidate login credential may reference, for example, the user name of the suggested credential. As shown, the interface may include an icon 54. In one embodiment, the icon 54 may be selected to reveal all saved passwords, even in instances where a candidate login credential was not verified. In addition, as shown in diagram 60, the system may display a list of candidate login credentials 61 that may (or may not) have been verified using the methods described above. In one embodiment, in order to present candidate login credentials 55 in a secure manner, the system may use a secure image.

Figure 6:
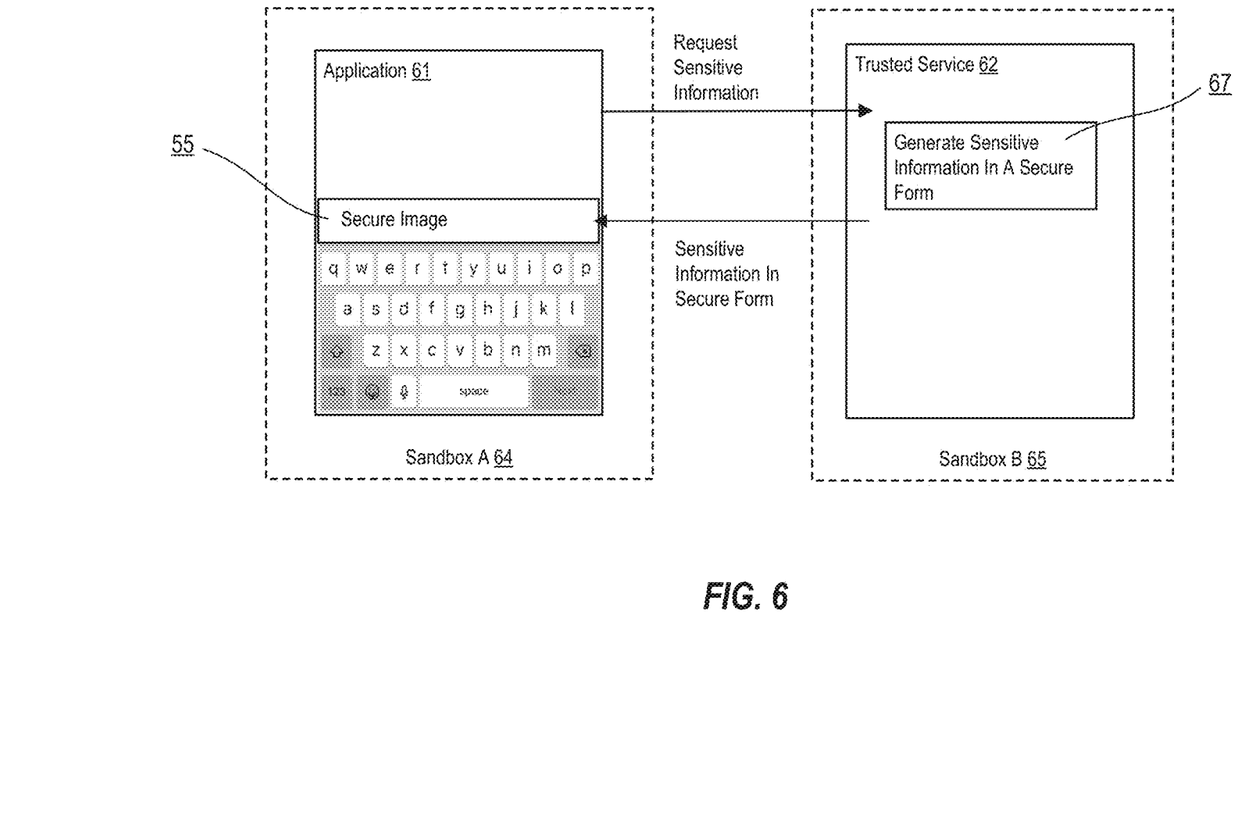
FIG. 6 is an example diagram illustrating an example interaction between an application and a trusted system/service to obtain a secure image of a candidate login credential.

FIG. 6 is an example diagram illustrating an example interaction with a trusted service 62 (or system) for obtaining a secure image 55 of a candidate login credential. As described above, an application 61 may retrieve login credentials. In one embodiment, the system may implement additional security measures to ensure that an application is not aware of content of potential candidate login credentials until a user confirms selection of a credential. For example, as part of the retrieval process, the application may request sensitive information (e.g. credentials) from a trusted service 62. Accordingly, the trusted service 62 may generate sensitive information in a secure form 67, which may then be provided to the application 61. For example, in the context of credentials, the trusted service 62 may generate (or render) a secure image 55 that may include information associated with the login credential (e.g. username). The secure image 55 may prevent the application (or other applications) from capturing the data displayed within the image. For example, a software screenshot or other software function would be rendered incapable of capturing the secure image 55.

As shown, the application 61 and trusted service 62 may each execute in separate sandboxes 64 and 65, respectively. In one embodiment, sandboxes 64 and 65 may each compartmentalize resources (e.g. data, memory addresses, processes, features, etc.) such that neither the application 61 nor the service 62 may access resources outside of their respective sandbox. In one embodiment, the trusted service 62 is controlled by a kernel of an operating system such that the trusted service 62 and the application 61 are scheduled separately by a scheduler of the kernel and are maintained in separate memory spaces or separate sandboxes as described above.

Figure 7:
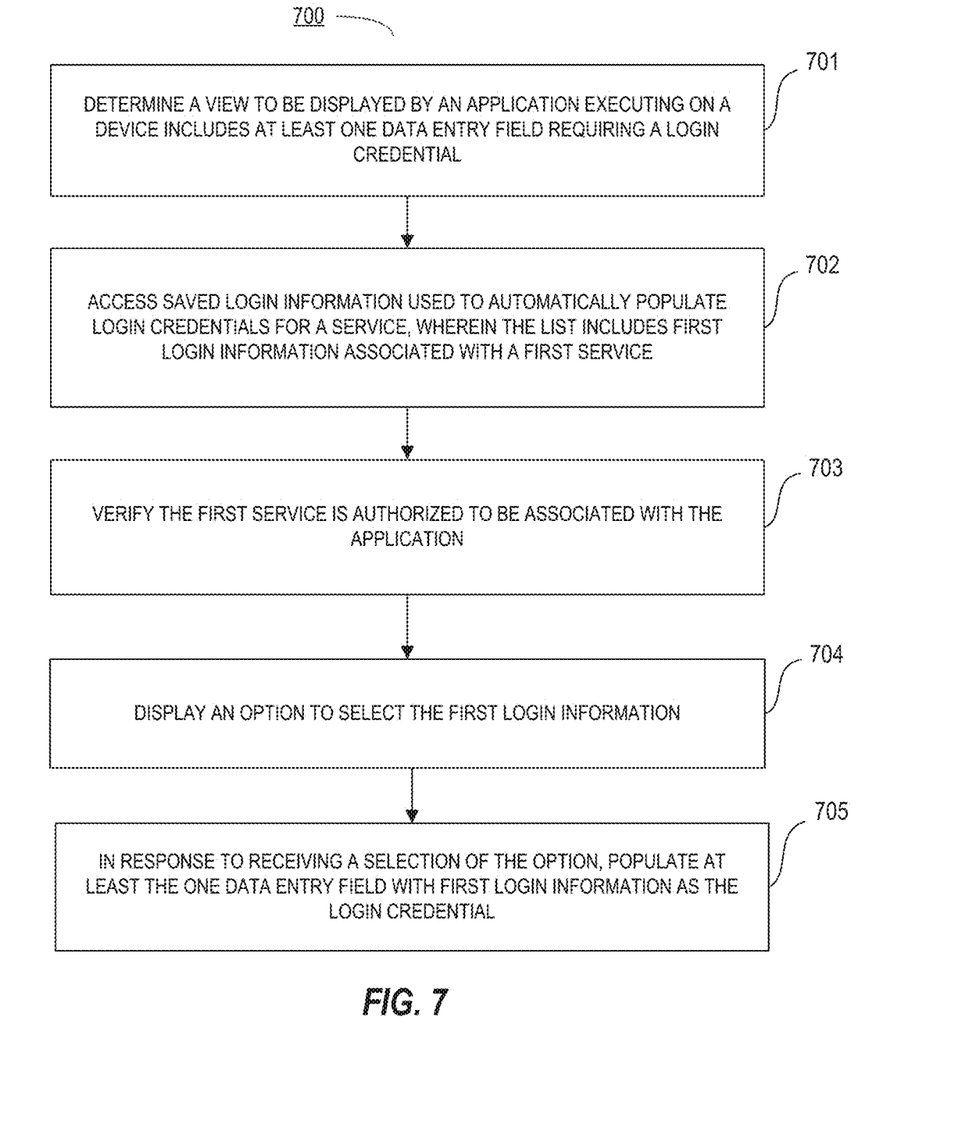
FIG. 7 is an example diagram illustrating a method of populating login credentials for an application according to an embodiment of the disclosure.

FIG. 7 is an example diagram illustrating a method of populating login credentials for an application according to an embodiment of the disclosure. Process 700 may use processing logic, which may include software, hardware, or a combination thereof. For example, process 700 may be performed by a system (e.g. client device 109).

In 701, the system may determine a view (e.g. view 51 as shown in FIG. 5) to be displayed by an application executing on the system includes at least one data entry field (e.g. fields 52 or 53) requiring a login credential.

In one embodiment, determining whether a view requires a login credential may include performing one or more heuristics to determine characteristics of the displayed page. For example, the characteristics may include determining whether a data entry field corresponds to a username or password field. The characteristics may also include determining the number of data entry fields. For example, determining the presence of two entry fields within proximity of each other may provide an indication of a username and password pair of data entry fields. In addition, various characteristics of a data entry field may also be considered such as whether the entry of the text is secured, which may provide an indication of the presence of a password field. Other characteristics of the fields themselves may also be considered such as whether or not the fields are transparent or visible. As another example, the characteristics of the fields may include the size, height, focus settings, etc.

In 702, the system, may access saved login information that is used to automatically populate login credentials for a service such as website. For example, the saved information may include first login information associated with a first website.

In 703, the system may verify a first service is authorized to be associated with the application executing on the system. As described above, the application may be verified in one or more ways. For example, the application may be verified based on confirming shared credentials (e.g. web credentials) with the first service. Accordingly, verifying the application is authorized to be associated with the first service may include determining the first service is included in an entitlements list of the application, and determining the application is included in a supported applications list of the first service. In one embodiment, the entitlements list of the application may be accessed from a file stored on the device and associated with the application. In one embodiment, the supported applications list of the first service may be accessed from a file stored on a website associated with the first service. In addition, the supported applications list may include a reference indicating the application is an authorized application for an entity that controls or operates the first service.

In one embodiment, the supported applications list may be stored within a JSON or similar type file (e.g. object file) as described above. In one embodiment, the file may include a signature. The signature may be a cryptographic signature to allow the JSON file to be validated as authentic from and authorized by the domain from which it was downloaded or accessed. Accordingly, the system may allow a domain to control which apps can be associated with the website. For example, when the installer software or operating system software of a client device use a signed JSON file to create associations owned and authorized by a website, it is possible for the website to control which applications or apps can be associated with the website.

In addition, a service may be verified based on determining the service is authorized to provide a universal or a deep link with the application. Accordingly, verifying the service is authorized to be associated with the application may include accessing a list of applications that support universal links and determining if the list includes a first URL associated with a first application. Accordingly, the system may determine whether the first URL includes a domain associated with the first service and determine whether the first application matches the application executing on the device. As described above, support for a universal link allows the application executing on the device to open, within the application, content of the first URL displayed in a different application.

In addition, a service may be verified based on determining the service is authorized to provide a continued activity capability (or handoff). Accordingly, verifying the service is authorized to be associated with the application may include accessing a list of applications that support a continued activity feature and determining the list includes a first activity associated with a first application. Accordingly, the system may determine the first activity is associated with the first service, and determine the first application matches the application executing on the device. As described above, support for the continued activity capability allows the application executing on the device to resume an activity, within the application, that was commenced on a different device.

In 704, the system may display an option to select the first login information. In one embodiment, and as shown in diagram 50 of FIG. 5, the system may display only the first login information along with a reference to the first website. For example, as shown, the interface provides an indication that the candidate login credential 55 is associated with the wikipedia.org website. In one embodiment, and as shown in diagram 60 of FIG. 5, the system may display the first login information amongst a list of login information candidates 61.

In 705, the system, in response to receiving a selection of the option, may populate at least the one data entry field with first login information as the login credential. In one embodiment, the at least one data entry field may include a first and second data entry field, as shown in FIG. 5, and the first login information may include a username 52 for the first data entry field and a password 53 for the second data entry field.

Accordingly, the disclosure provides a convenient and safe mechanism to retrieve applicable login credentials to enhance a user experience.

It should be noted that there may be variations to the flow diagrams or the steps (or operations) described therein without departing from the embodiments described herein. For instance, the steps may be performed in parallel, simultaneously, a differing order, or steps may be added, deleted, or modified.

Figure 8:
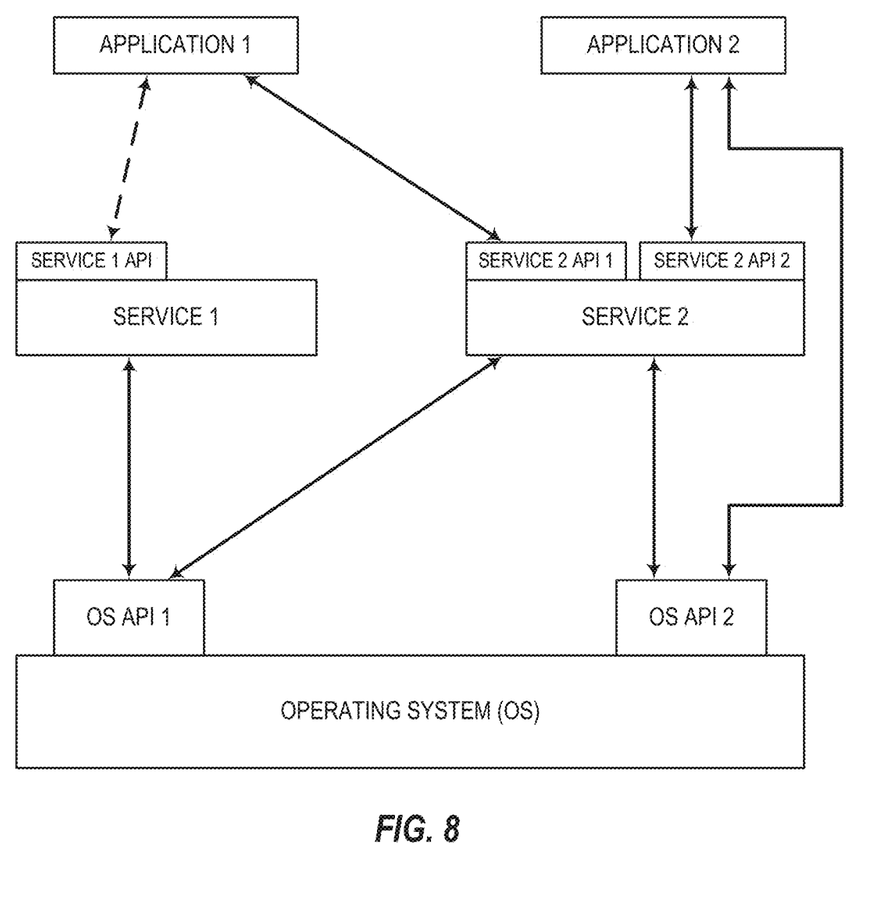
FIG. 8 is an example software stack that may be used in some embodiments of the disclosure.

FIG. 8 is an example software stack that may be used in some embodiments of the disclosure. For example, the software stack may allow an application to subscribe to one or more features as described above (e.g. shared credentials, universal links, handoff, etc.). As shown, applications can make calls to Services 1 or 2 using several Service APIs and to Operating System (OS) using several OS APIs. Services 1 and 2 can make calls to OS using several OS APIs. Note that the Service 2 has two APIs, one of which (Service 2 API 1) receives calls from and returns values to Application 1 and the other (Service 2 API 2) receives calls from and returns values to Application 2, Service 1 (which can be, for example, a software library) makes calls to and receives returned values from OS API 1, and Service 2 (which can be, for example, a software library) makes calls to and receives returned values from both as API 1 and OS API 2, Application 2 makes calls to and receives returned values from as API 2.

Figure 9:
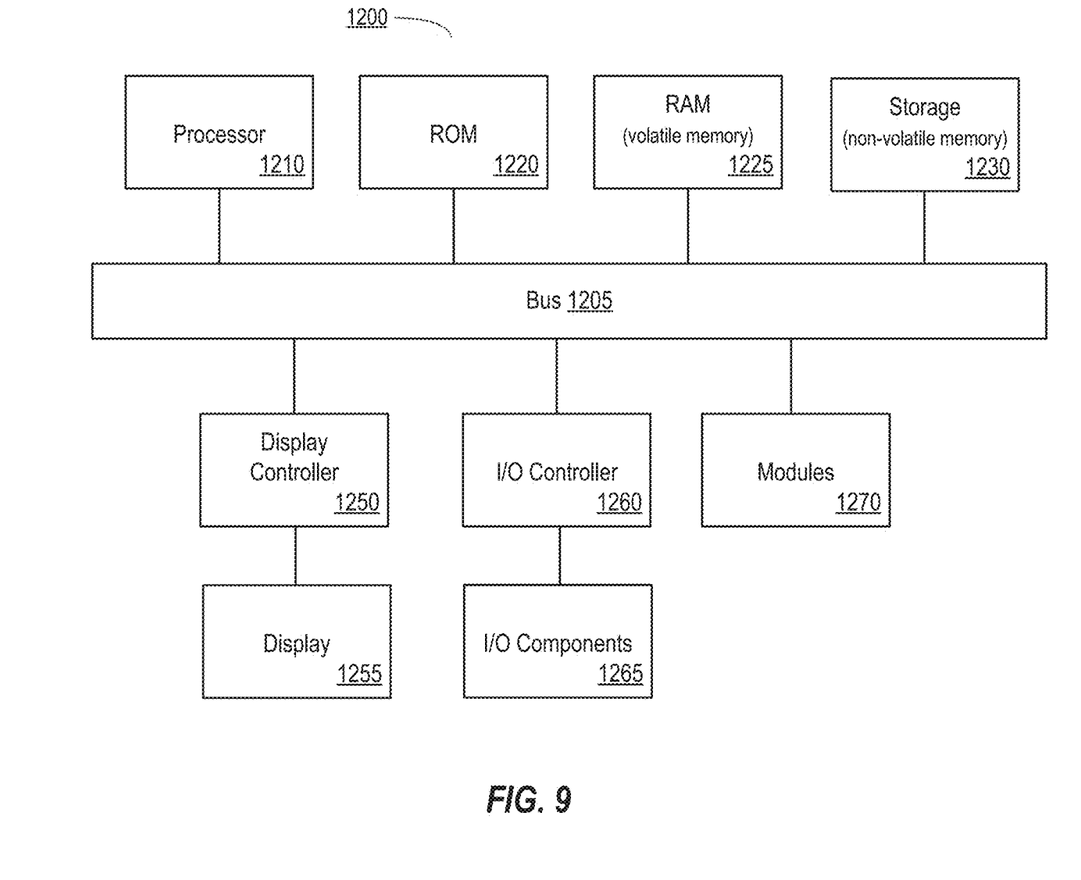
FIG. 9 is a block diagram illustrating an example computing system that may be used in conjunction with one or more of the embodiments of the disclosure.

FIG. 9 is a block diagram illustrating an example computing system that may be used in conjunction with one or more of the embodiments of the disclosure. For example, computing system 1200 (or system, or computing device, or device) may represent any of the devices or systems (e.g. client device 109-111) described herein that perform any of the processes, operations, or methods of the disclosure. Note that while the computing system illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 1200 may include a bus 1205 which may be coupled to a processor 1210, ROM (Read Only Memory) 1220, RAM (or volatile memory) 1225, and storage (or non-volatile memory) 1230. The processor 1210 may retrieve stored instructions from one or more of the memories 1220, 1225, and 1230 and execute the instructions to perform processes, operations, or methods described herein. These memories represent examples of a non-transitory machine-readable medium (or computer-readable medium) or storage containing instructions which when executed by a computing system (or a processor), cause the computing system (or processor) to perform operations, processes, or methods described herein. The RAM 1225 may be implemented as, for example, dynamic RAM (DRAM), or other types of memory that require power continually in order to refresh or maintain the data in the memory. Storage 1230 may include, for example, magnetic, semiconductor, tape, optical, removable, non-removable, and other types of storage that maintain data even after power is removed from the system. It should be appreciated that storage 1230 may be remote from the system (e.g. accessible via a network).

A display controller 1250 may be coupled to the bus 1205 in order to receive display data to be displayed on a display device 1255, which can display any one of the user interface features or embodiments described herein and may be a local or a remote display device. The computing system 1200 may also include one or more input/output (I/O) components 1265 including mice, keyboards, touch screen, network interfaces, printers, speakers, and other devices. Typically, the input/output components 1265 are coupled to the system through an input/output controller 1260.

Modules 1270 (or components, units, functions, or logic) may represent any of the functions or engines described above. Modules 1270 may reside, completely or at least partially, within the memories described above, or within a processor during execution thereof by the computing system. In addition, modules 1270 can be implemented as software, firmware, or functional circuitry within the computing system, or as combinations thereof.

It should be noted that the term "approximately" or "substantially" may be used herein and may be interpreted as "as nearly as practicable," "within technical limitations," and the like. In addition, the use of the term "or" indicates an inclusive or (e.g. and/or) unless otherwise specified.

In the foregoing specification, example embodiments of the disclosure have been described. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A non-transitory machine-readable medium storing instructions executable by a computing device to cause the computing device to perform operations comprising:
   determining a view to be displayed by an application executing on the computing device includes at least one data entry field requiring a login credential;
   in response to determining the view requires the login credential, accessing saved login information used to automatically populate login credentials for a plurality of services, wherein the saved login information includes first login information for authenticating to a first of the plurality of services;
   downloading a remotely stored file that includes metadata about the first service;
   verifying the first service has authorized the first login information to be used with respect to the application by:
      comparing the metadata about the first service with metadata maintained about the application; and
      validating an authenticity of the metadata based on a signature added to the file;
   displaying an option to select the first login information; and
   in response to receiving a selection of the option and based on the verifying, populating at least the one data entry field with the first login information as the login credential.

2. The medium of claim 1, wherein verifying the first service has authorized use of the first login information includes:
   determining the first service is included in an entitlements list of the application, wherein the entitlements list of the application is stored on the computing device; and
   determining the application is included in a supported applications list of the first service, wherein the supported applications list is included in the downloaded file.

3. The medium of claim 2, wherein the first service is associated with a website, and wherein the entitlements list of the application includes a domain of the website.

4. The medium of claim 3, wherein the file is stored on the website that is associated with the first service.

5. The medium of claim 4, wherein the signature is from the website.

6. The medium of claim 4, wherein an entitlement granted to the domain indicates the application supports one or more of sharing web credentials with the domain, universal linking from the domain, and continued activity from the domain.

7. The medium of claim 4, wherein the supported applications list includes a reference indicating the application is an authorized application for an entity that controls or operates the website.

8. The medium of claim 1, wherein verifying the first service has authorized use of the first login information includes:
   determining the application supports sharing credentials with the first service, wherein sharing credentials allows the application to share one or more credentials with a different application or service.

9. The medium of claim 8, wherein determining the application supports sharing credentials with the first service includes:
   accessing a list, stored on the computing device, of applications that support shared credentials;
   determining the list includes a first domain associated with the application; and
   determining the first domain matches a domain associated with the first service.

10. The medium of claim 1, wherein verifying the first service has authorized use of the first login information includes:
    determining the application supports universal linking with the first service, wherein universal linking allows the application executing on the computing device to open, within the application, content of a URL displayed in a different application.

11. The medium of claim 10, wherein determining the application supports universal linking with the first service includes:
    accessing a list of applications that support universal links;
    determining the list includes a first URL associated with the application; and
    determining the first URL includes a domain associated with the first service.

12. The medium of claim 1, wherein verifying the first service has authorized use of the first login information includes:
    determining the application supports continued activity with the first service, wherein continued activity allows the application executing on the computing device to resume an activity, within the application, that was commenced on a different device.

13. The medium of claim 12, wherein determining the application supports continued activity with the first service includes:
    accessing a list of applications that support continued activity;
    determining the list includes a first activity associated with the application; and
    determining the first activity matches an activity that is performed with the first service.

14. The medium of claim 1, wherein the at least one data entry field includes a first and second data entry field and the first login information includes a username for the first data entry field and a password for the second data entry field.

15. The medium of claim 1, wherein the operations further comprise:
    determining one of more characteristics of the at least one data entry field correspond to a username or password field.

16. The medium of claim 1, wherein displaying the option to select the first login information includes displaying a secure image of information associated with the login credential, and wherein the application is not aware of contents of the login credential until the option is selected.

17. The medium of claim 16, wherein the secure image of information associated with the login credential is provided by a trusted service that executes in a separate memory space or a separate sandbox than the application.

18. The medium of claim 17, wherein the trusted service is controlled by a kernel of an operating system such that the trusted service and the application are scheduled separately by a scheduler of the kernel and are maintained in separate memory spaces or separate sandboxes.

19. The medium of claim 1, wherein displaying the option to select the first login information includes displaying only the first login information along with a reference to the first service.

20. The medium of claim 1, wherein displaying the option to select the first login information includes displaying the first login information amongst a list of login information candidates.

21. A computing device, comprising:
one or more processors; and
a memory storing program instructions executable by the one or more processors to cause the computing device to perform operations including:
determining a view to be displayed by an application executing on the computing device includes at least one data entry field requiring a login credential;
accessing saved login information associated with one or more services, wherein the saved login information includes first login information associated with a first service;
downloading, from a server, a file that includes metadata about the first service and a signature;
verifying the first service has authorized the first login information to be used by:
verifying the metadata about the first service against metadata about the application; and
validating an authenticity of the metadata based on the signature;
displaying an option to select the first login information; and
in response to receiving a selection of the option and based on the verifying, populating at least the one data entry field with the first login information as the login credential.

22. The computing device of claim 21, wherein verifying the first service has authorized the first login information to be used by the application includes:
determining the first service is included in an entitlements list of the application stored on the computing device, wherein the first service is associated with a website and the entitlements list includes a domain of the website; and
determining the application is included in a supported applications list of the first service stored on the website that is associated with the first service.

23. The computing device of claim 21, wherein verifying the first service has authorized the first login information to be used by the application includes:
determining the application supports sharing credentials with the first service, wherein sharing credentials allows the application to share one or more credentials with a different application or service, wherein determining the application supports sharing credentials with the first service includes:
accessing a list, stored on the computing device, of applications that support shared credentials;
determining the list includes a first domain associated with the application; and
determining the first domain matches a domain associated with the first service.

24. The computing device of claim 21, wherein verifying the first service has authorized the first login information to be used by the application includes:
determining the application supports universal linking with the first service, wherein universal linking allows the application to open, within the application, content of a URL displayed in a different application, wherein determining the application supports universal linking with the first service includes:
accessing a list of applications that support universal links;
determining the list includes a first URL associated with the application; and
determining the first URL includes a domain associated with the first service.

25. The computing device of claim 21, wherein verifying the first service has authorized the first login information to be used by the application includes:
determining the application supports continued activity with the first service, wherein continued activity allows the application to resume an activity, within the application, that was commenced on a different device, wherein determining the application supports continued activity with the first service includes:
accessing a list of applications that support continued activity;
determining the list includes a first activity associated with the application; and
determining the first activity matches an activity that is performed with the first service.

26. A method, comprising:
determining, by a computing device, a view to be displayed by an application executing on the computing device includes at least one data entry field requiring a login credential;
accessing saved login information used to automatically populate login credentials for a plurality of services, wherein the saved login information includes first login information associated with a first web service of the plurality of services;
downloading, from the first web service, a file that includes metadata about the first web service;
verifying the application is authorized to be associated with the first web service by:
determining whether the metadata about the first web service matches metadata stored about the application; and
validating an authenticity of the metadata based on a signature added to the file by the first web service; and
based on the verifying, populating at least the one data entry field with the first login information as the login credential.

27. The method of claim 26, wherein verifying the application is authorized to be associated with the first web service includes:
determining the first web service is included in an entitlements list of the application stored on the computing device, wherein the first web service is a website and the entitlements list includes a domain of the website; and
determining the application is included in a supported applications list of the first web service in the downloaded file.

28. The method of claim 26, wherein verifying the application is authorized to be associated with the first web service includes:
determining the application supports sharing credentials with the first web service, wherein sharing credentials allows the application to share one or more credentials with a different application or service, wherein determining the application supports sharing credentials with the first web service includes:
accessing a list, stored on the computing device, of applications that support shared credentials,
determining the list includes a first domain associated with the application, and determining the first domain matches a domain associated with the first web service.

29. The method of claim 26, wherein verifying the application is authorized to be associated with the first web service includes:
determining the application supports universal linking with the first web service, wherein universal linking allows the application to open, within the application, content of a URL displayed in a different application, wherein determining the application supports universal linking with the first web service includes:
accessing a list of applications that support universal links;
determining the list includes a first URL associated with the application; and
determining the first URL includes a domain associated with the first web service.

30. The method of claim 26, wherein verifying the application is authorized to be associated with the first web service includes:
determining the application supports continued activity with the first web service, wherein continued activity allows the application to resume an activity, within the application, that was commenced on a different device, wherein determining the application supports continued activity with the first web service includes:
accessing a list of applications that support continued activity;
determining the list includes a first activity associated with the application; and
determining the first activity matches an activity that is performed with the first web service.

* * * * *